[11] 3,629,602

[72] Inventor Arthur H. Firester
Kendall Park, N.J.
[21] Appl. No. 37,648
[22] Filed May 15, 1970
[45] Patented Dec. 21, 1971
[73] Assignee The United States of America as represented by the Secretary of the Army

[54] PARAMETRIC OPTICAL SYSTEM
10 Claims, 5 Drawing Figs.
[52] U.S. Cl. ...................................... 307/88.3, 250/83.3 HP
[51] Int. Cl. ...................................... H03f 7/00
[50] Field of Search ........................... 307/88.3; 250/83.3 HP

[56] References Cited
UNITED STATES PATENTS
3,517,993  6/1970  Fein et al. ..................... 250/83.3 HP OTHER REFERENCES
Warner, " Journal of Quantum Electronics," June 1969, pp. 354- 355.
Andrews, " Journal of Quantum Electronics," June 1969, pp. 355- 356.
Firester, " Journal of Applied Physics," Nov. 1969, pp. 4,849- 4,853.

Primary Examiner—John Kominski
Assistant Examiner—Darwin R. Hostetter
Attorneys—Harry M. Saragovitz, Edward J. Kelly, Herbert Berl and Daniel D. Sharp ABSTRACT: A parametric optical system in which an object beam of a first frequency is combined within an optically nonlinear medium with a substantially planar optical pump beam of a second frequency to provide either an upconverted image at the sum (or difference) frequency or an amplified version of the object beam, depending upon the design of the nonlinear medium, characterized in that a first lens of a given focal length is positioned between the object and the nonlinear medium and spaced from each by a distance equal to said focal length; this lens serves as a Fourier transform mechanism wherein the Fourier transform plane of the object is located substantially in the center of the nonlinear medium; that is, an image that is the Fourier transform of the object is formed in the back focal plane of the lens at which focal plane the nonlinear medium is situated. Furthermore, a similar Fourier transform technique is used between the nonlinear medium and the observer or detecting device; that is, a second lens is positioned a focal length distant from both the nonlinear medium and the detecting device for generating the Fourier transform of the upconverted (or amplified) image of the medium. In this manner, the optical resolution is unlimited by the thickness of the nonlinear medium.

INVENTOR.
ARTHUR H. FIRESTER

ATTORNEYS

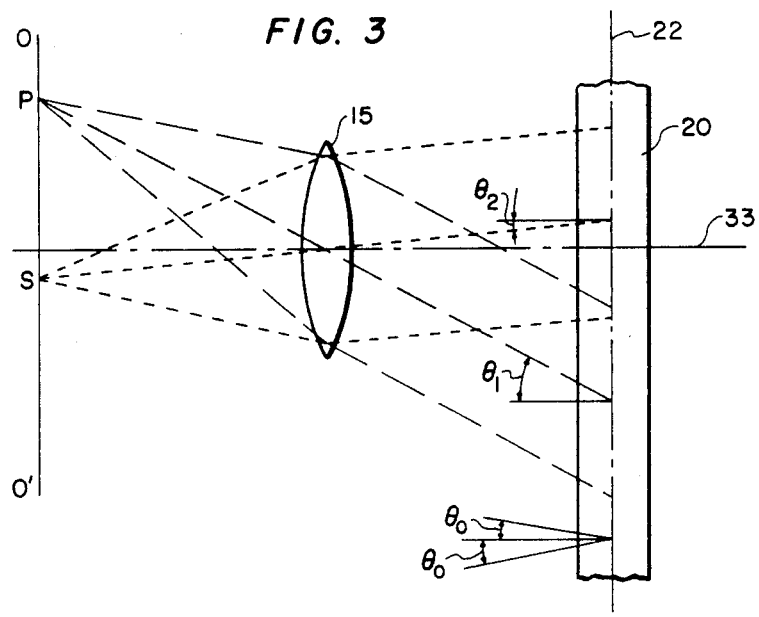
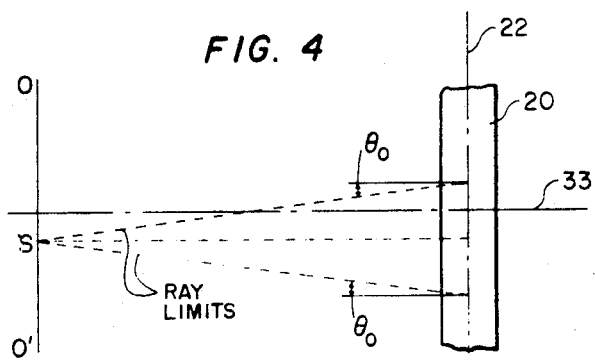
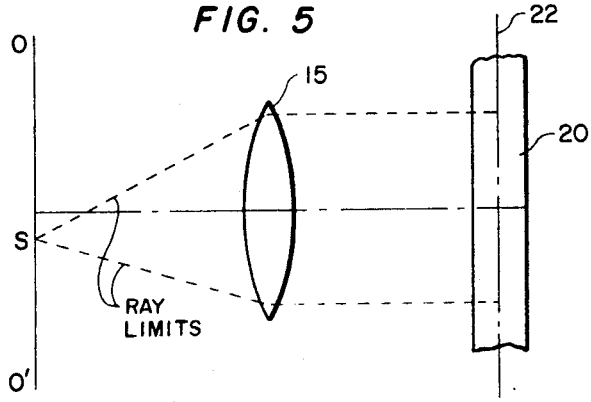

ગ3,629,602

PARAMETRIC OPTICAL SYSTEM

BACKGROUND OF THE INVENTION

Optical parametric systems are known in which an optical beam of a given frequency, such as that from a laser (or an image beam derived from said optical beam, for example by a telescopic lens system), as well as an optical pump beam of another frequency, are directed into an optically nonlinear material, such as a crystal of lithium niobate or potassium dihydrogen phosphate. The object radiation of frequency $\omega_1$ interacts with the pump radiation $\omega_2$ inside the optically nonlinear material, and, depending upon whether the system is designed to serve as an optical image upconverter or as an optical amplifier, an image beam of frequency $\omega_2 \pm \omega_1$, or a beam of the initial frequency $\omega_1$, but of greater intensity, emerges from the nonlinear material. In either case, the resolution of the amplified (or upconverted) object beam previously has been limited by the finite thickness of the nonlinear medium with the resolution decreasing as the thickness increases.

SUMMARY OF THE INVENTION

In accordance with the invention, it is possible to minimize the normal degradation of resolution of the object beam normally accompanying an optically nonlinear parametric medium of finite thickness by inserting a positive lens between the object (or real image) and the nonlinear material and by spacing this lens one focal length distant from both the plane of the object (or real image) and from the central transverse plane of the nonlinear medium. It should be noted that the lens as used in this manner is not the usual focusing lens; instead, all rays which emanate from a given point on the object and which impinge upon the lens emerge parallel, and are nearly parallel to a pump beam directed along the optic axis of the system, provided the object field of view is not made too large; in other words, when waves from an object encounter a lens displaced by one focal length, all light coming from any given point of the object emerges from the lens as plane waves before impinging upon the nonlinear parametric material. The optical parametric interaction occurs in the optically nonlinear material for waves impinging thereupon within a certain angle of incidence relative to the optic axis—as determined by the pump beam direction—referred to as the acceptance cone. This range is dependent upon certain parameters of the material, such as thickness and crystal type.

If the object is too large, there will be points therealong from which optical rays, upon passing through the lens will be directed at such a large angle with respect to the optic axis (the axis along which the pump beam is directed) that radiation from such points of the object do not become converted or amplified. This results in the reduction in field of view in the converted or amplified image. However, for all points along the object from which rays fall upon the nonlinear medium within said acceptance angle, all rays from a given one of such points which are able to strike the lens are directed onto the nonlinear medium within the desired acceptance angle and such rays all contribute to the converted or amplified image.

Without the lens, many of the rays emanating from a given point on the object, even if they impinged upon the nonlinear material, would not fall within the acceptance angle. Consequently, such rays would not be converted or amplified at the nonlinear material and the resolution would be reduced. By using the lens in the manner mentioned above, the number of rays emanating from a point source which are captured by the lens and directed within the desired acceptance angle is greatly increased and is limited only by the aperture of the lens, rather than being determined by the relatively limited acceptance angle of the nonlinear material. Reasonably large lens apertures pose no appreciable design problem and are readily attainable.

Because of the finite thickness of the nonlinear medium, the electromagnetic upconverted or amplified field apparently coming from the medium at some point along a selected transverse plane of the material normally is a complex field resulting from contributions thereto of the electric fields at many other points in other transverse planes of the material. The practical effect is that if light from the object were focused to a minute point in the nonlinear medium, after upconversion or amplification, the point's image would be spread out and appear as a larger circular area of light in the medium; this area being generally of lesser intensity at the edges than at the center. This property, caused by the material's thickness, is sometimes referred to as the point-spread function. The diameter of this circular area would increase and consequently, the resolution would become poorer as the nonlinear material is made thicker. A similar loss of resolution or point spreading would occur even for objects focused a finite distance beyond or in front of the nonlinear material. In order to reduce appreciably this point-spread function by decreasing the thickness, one must resort to nonlinear material of impractically small dimensions, which, to say the least, would be fragile and impractical to fabricate. It can be shown that, not only by placing the lens one focal length from the actual radiating object, but also by positioning the center transverse plane of the nonlinear medium a focal length from the lens, that this central transverse plane of the medium becomes the Fourier transform plane of the object; that is, the converted or amplified image at the nonlinear medium is the Fourier transform of the object. This eliminates the aforementioned spreading of object points which results in resolution loss; instead, the thickness of the nonlinear material causes the field of view of the object to be reduced.

Summarizing, reduction in resolution of the upconverted or amplified image owing to the point spread is eliminated by insertion of a lens of focal length $f$ between the object and the nonlinear medium and spaced one focal length $f$ from each. The use of the lens allows for greater contribution of radiation from any given point on the object to the parametric interaction process. The reduction in field of view resulting from the insertion of the lens between the object and the nonlinear medium is traded off in order to obtain substantial improvement in resolution. In order for the image at the nonlinear medium to be detected by suitable detecting means, a suitable lens is positioned halfway between the nonlinear medium and the detecting device and spaced a distance equal to the focal length of said lens from both the nonlinear medium and the detecting device.

DESCRIPTION OF THE DRAWINGS

FIG. 3 is a view illustrating the effect of inserting the lens between the object and the nonlinear medium and spaced one focal length from each;

FIG. 4 is a view illustrating the resolution limitation occurring when such a lens is omitted; and FIG. 5 is a view illustrating the improved resolution obtainable when such a lens is used.

DETAILED DESCRIPTION OF THE PREFERRED EMBODIMENT

Figure 1:
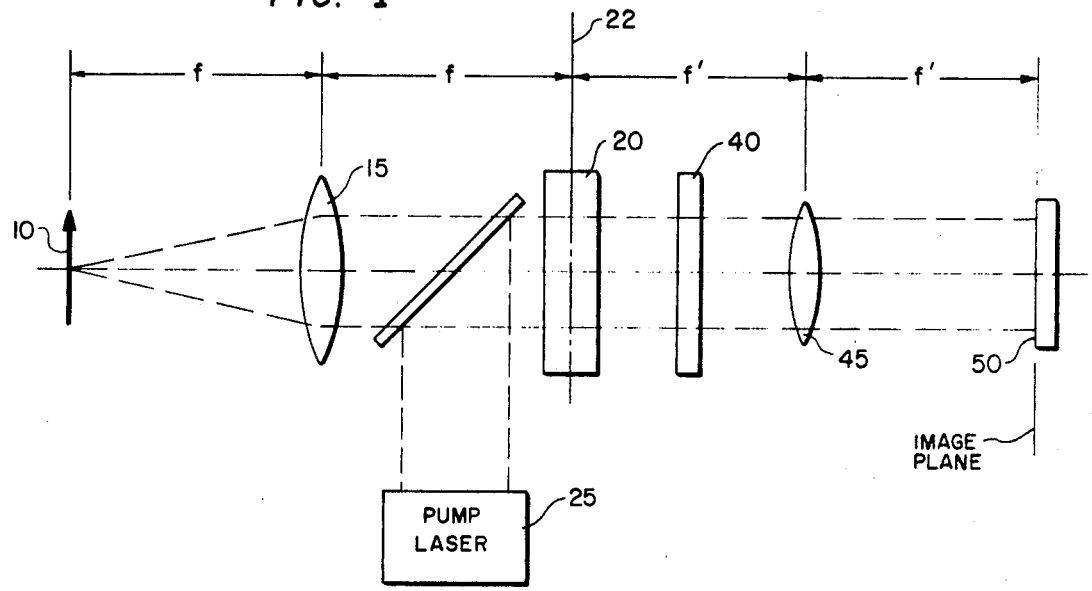
FIG. 1 is a schematic diagram of a parametric optical system according to the invention.
Figure 2:
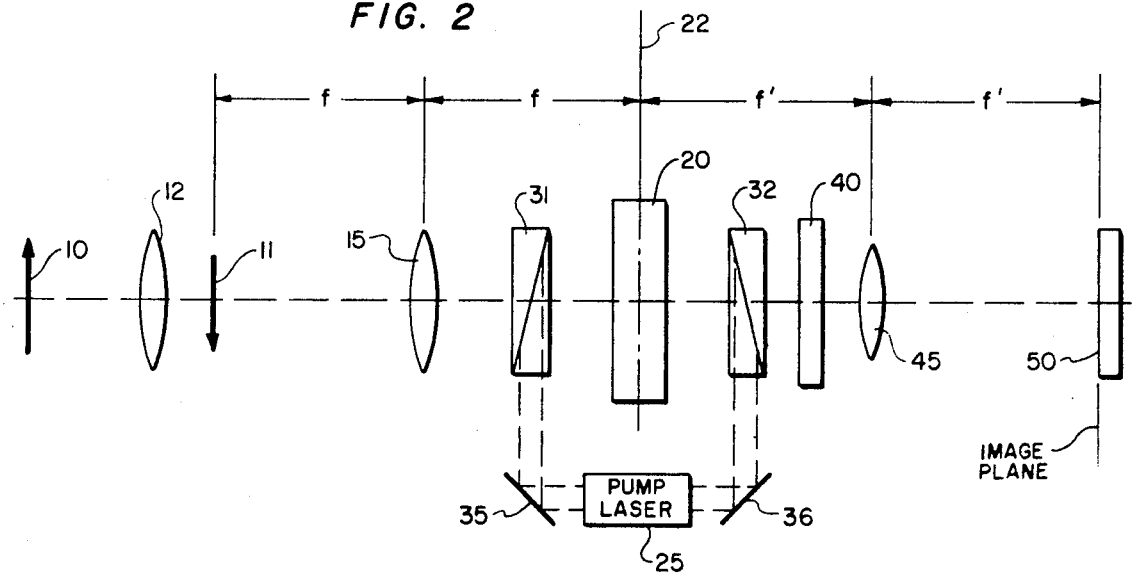
FIG. 2 is a schematic diagram of a modification of the optical system shown in FIG. 1.

A parametric optical system according to the invention is illustrated in FIG. 1. The object 10 to be imaged can take any form and can be three-dimensional, but is represented, for reasons of simplicity, as an arrow. In some cases, as shown in FIG. 2, where the object is at a considerable distance, a real image 11 of the object 10 may be obtained by a suitable optical focusing arrangement, such as a standard telescope including at least one lens 12. A lens 15 of focal length $f$ is placed a distance $f$ from either the object 10, or the real image 11, as in the system of FIG. 2; that is, the object is positioned in the front focal plane of lens 15. An optically nonlinear medium 20 is positioned in the back focal plane of lens 15 such that the central transverse plane 22 of the medium 20 is at the same distance $f$ from lens 15 as from object 10. Owing to the location of lens 15, the nonlinear material 20 is centered on the location of the Fourier transform of the object or real image, as the case may be. Pump radiation of frequency differing from that of the object radiation is directed onto the medium 20 parallel to the optic axis 33 of the system. The nonlinear medium 20, for example, can be a relatively thick crystal slab of such materials as barium sodium niobate, lithium niobate or potassium dihydrogen phosphate and the medium 20 is either properly cut and oriented, as in the case of potassium dihydrogen phosphate, or thermally controlled, as in the case of lithium niobate, so that the index matching of the object radiation and the pump radiation necessary for proper conversion or amplifying is achieved. A parallel pump beam emanating from pump laser 25 is directed onto a beam splitter 30 from which the pump beam is reflected onto the medium 20. As indicated in FIG. 1, the beam splitter may be a dichroic reflecting surface or mirror 30 which passes radiation of frequency $\omega_1$ from the object 10 and reflects the pump radiation of frequency $\omega_2$ along the optic axis 33. Alternately, the two beams can be combined by a polarizing beam splitter, such as beam splitter 31 shown in FIG. 2. Moreover, as shown in FIG. 2, another beam splitter 32 can be added to salvage some of the unused pump radiation transmitted through the nonlinear medium 20 and to feed it back to the pump laser 25, thereby operating the pump laser medium within the cavity resonator bounded by mirrors 35 and 36. The object radiation of frequency $\omega_1$ interacts with the pump radiation of frequency $\omega_2$ and generates an upconverted image of frequency $\omega_1 \pm \omega_2$, or an amplified beam of frequency $\omega_1$, emerges from nonlinear medium 20. The output radiation from medium 20 is filtered by filter 40. The filter 40 is selected to transmit only radiation at one of the two upconverted frequencies $\omega_2 \pm \omega_1$ and to block both object radiation of frequency $\omega_1$ and the pump radiation of frequency $\omega_2$ when an image conversion system is desired, such as a system for conversion of infrared images into the visible portion of the spectrum, or to transmit $\omega_1$ and block $\omega_2$ and possibly $\omega_2 - \omega_1$, when an image amplifier is desired.

In order to provide a detectable image of the object 10 at detector means 50, it is necessary to provide a second lens 45 between the nonlinear medium 20 and detector 50. This detector may, for example, be any type of detector sensitive to the output radiation, such as an indium antimonide detector for infrared radiation, or any photosensitive detector for visible radiation. In order to provide a high resolution image, it is necessary to place a Fourier transform lens between the medium 20 and the detector 50, in a manner already described in connection with lens 15. Lens 45, which has a focal length $f$, is placed mid-way between the central transverse plane 22 of the medium 20 and the detector 50 and is spaced one focal length $f'$ from each. The parametrically converted or amplified image of high resolution thus is located at the back focal plane of the second lens 45. The focal length $f'$ of lens 45 need not be the same as the focal length $f'$ of lens 15; in fact, if the human eye is used as lens 45, as shown in FIG. 2, the focal length of the eye will establish the distance $f'$.

In order to clarify the manner of operation of the system of either FIGS. 1 or 2, reference will be made to FIGS. 3-7. In FIG. 3, a lens 15 is shown positioned mid-way between an object plane O—O' and the nonlinear medium 20. For purposes of explanation, it will be assumed that the nonlinear medium 20 is of unlimited extent. Using geometrical optical principles, rays from the point P of object plane O—O' will pass through the lens 15 in the manner indicated by the long-dashed lines in FIG. 3 indicating that the rays from point P of the object plane will form a beam which is deflected by lens 15 downwardly at an angle $\theta_1$ with respect to the direction of the pump beam energy, which is along the optic axis 33 of the system. If the acceptance angle of the nonlinear medium is $\theta_0$, that is the maximum angle relative to the pump beam axis at which object radiation will interact parametrically with the pump radiation, it will be seen that the beam from point P will not fall within the acceptance angle and will be of no use in the conversion process. This is true whether or not the beam strikes the nonlinear medium 20. Rays from a point S in object point O-O' will be formed by lens 15 into a beam, as indicated by short-dashed lines, which will be deflected by lens 15 and impinge upon the medium 20 at an angle $\theta_s$; this angle is seen to be within the acceptance angle $\theta_0$ and rays from point S will contribute to the parametric interaction between the pump beam and the rays from this point. From the above description, it is evident that the field of view, that is the region along the object plane within which conversion can be achieved, is somewhat restricted by insertion of lens 15. It should be noted, however, as shown in FIG. 4, that if one were to omit lens 15 and were to consider rays from the point S in the object O-O' directed onto the medium 20, only a very small number of rays from this point will fall within the aforesaid acceptance angle of the material. By inserting lens 15, on the other hand, as indicated in FIG. 5, many rays from the point S in the object plane O-O' can be directed out of the lens at a sufficiently small angle relative to the optic axis 33 to allow appropriate parametric interaction at medium 20. In other words, the number of rays from such points as point S in the object plane is greatly increased by means of the lens so that all rays that are intercepted by said lens from such points can be made to contribute to the desired parametric interaction at medium 20. This resolution is limited only by the aperture of the lens 15, which can be made relatively large, and is no longer restricted by the comparatively narrow acceptance angle of the nonlinear medium 20.

It should be understood, of course, that the foregoing disclosure relates to only a preferred embodiment of the invention and that numerous modifications or alterations may be made therein without departing from the spirit and the cope of the invention as set forth in the appended claims.

What is claimed is:

1. A parametric optical system comprising a pump source and an optically nonlinear medium responsive to electromagnetic energy of a first frequency from an object and to electromagnetic energy of a second frequency from said pump source for achieving parametric interaction therebetween, and a lens of focal length $f$ positioned midway between said object and said medium at a distance $f$ from said object and from said medium.

2. A parametric optical system as recited in claim 1 further including a detector means for detecting the image formed at said medium and a second lens positioned between said medium and said detector means and spaced from said medium and said detector by the focal length of said second lens.

3. A parametric optical system according to claim 1 wherein said interaction within said medium provides an upconverted image at the algebraic sum of the frequencies of said object energy and said pump energy.

4. A parametric optical system according to claim 2 wherein said interaction within said medium provides an upconverted image at the algebraic sum of the frequencies of said object energy and said pump energy.

5. A parametric optical system according to claim 1 wherein said interaction within said medium provides an amplified image at the frequency of said object energy.

6. A parametric optical system according to claim 2 wherein said interaction within said medium provides an amplified image at the frequency of said object energy.

7. A parametric optical system as recited in claim 4 further including a filter positioned between said medium and said detector means for transmitting only energy at one of the two converted frequencies and to block energy at the pump frequency and at the other of said converted frequencies.

8. A parametric optical system as recited in claim 6 further including a filter positioned between said medium and said detector means for transmitting only the amplified energy at the object frequency and to block passage of said pump energy and the converted energy.

9. A parametric optical system according to claim 1 wherein said lens serves to provide a Fourier transform of the object at a central transverse plane passing through said medium.

10. A parametric optical system according to claim 2 wherein said second lens provides a Fourier transform of the image at said medium at the location of said detector means.

* * * * *